(12) United States Patent
Shin et al.

(10) Patent No.: US 6,992,683 B2
(45) Date of Patent: Jan. 31, 2006

(54) COLOR CONVERSION APPARATUS AND METHOD THEREOF

(75) Inventors: Yoon-Cheol Shin, Seoul (KR); Moon-Cheol Kim, Yongin (KR)

(73) Assignee: Samsung Electronics Co., Ltd., Gyeinggi-do (KR)

( * ) Notice: Subject to any disclaimer, the term of this patent is extended or adjusted under 35 U.S.C. 154(b) by 0 days.

(21) Appl. No.: 10/773,208

(22) Filed: Feb. 9, 2004

(65) Prior Publication Data

US 2004/0233218 A1    Nov. 25, 2004

(30) Foreign Application Priority Data

May 22, 2003  (KR) ...................... 10-2003-0032644

(51) Int. Cl.
*G09G 5/02* (2006.01)

(52) U.S. Cl. ...................... 345/589; 345/590; 345/591; 345/600; 345/601; 345/604; 382/167

(58) Field of Classification Search ........ 345/589–591, 345/600, 601, 604; 382/167
See application file for complete search history.

(56) References Cited

U.S. PATENT DOCUMENTS

| | | | |
|---|---|---|---|
| 6,400,843 B1 * | 6/2002 | Shu et al. ................... | 382/167 |
| 2003/0011613 A1 * | 1/2003 | Booth, Jr. ................... | 345/589 |
| 2005/0031199 A1 * | 2/2005 | Ben-Chorin et al. ........ | 382/162 |

* cited by examiner

*Primary Examiner*—Matthew C. Bella
*Assistant Examiner*—Antonio Caschera
(74) *Attorney, Agent, or Firm*—Sughrue Mion, PLLC

(57) ABSTRACT

A color conversion apparatus and method. The color conversion apparatus converts an input color signal to match a color gamut of the input color signal with a color gamut of a target Multi Primary Display (MPD) using at least four or more primary colors, and comprises a WYV color signal conversion unit for converting the input color signal into a WYV color signal for an output; a color gamut matching gain calculation unit for calculating a matching gain which is a conversion constant for matching the color gamut of the input color signal with the color gamut of the target MPD; a color gamut matching unit for correcting the WYV color signal based on the matching gain; an XYZ color signal conversion unit for converting the corrected WYV color signal into an XYZ color signal for an output; and an MPD control vector calculation unit for calculating a control vector which is a driving signal of the target MPD corresponding to the XYZ color signal.

10 Claims, 7 Drawing Sheets

COLOR CONVERSION APPARATUS AND METHOD THEREOF

CROSS-REFERENCE TO RELATED APPLICATIONS

This application claims the benefit of Korean Patent Application No. 2003-32644, filed on May 22, 2003, in the Korean Intellectual Property Office, the disclosure of which is incorporated herein by reference.

BACKGROUND

1. Field of the Invention

The present invention relates to a color conversion apparatus and method, and more particularly, to a color conversion apparatus and method for converting an inputted standard color signal so that a color gamut of the inputted standard color signal can match a color gamut of a multi-primary display (MPD) reproducing the standard color signal.

2. Description of the Related Art

In general, color-reproducing devices such as monitors, scanners, printers, and so on, use different color spaces or color models depending on where and what they are used for. For example, the CMY color space is used for color image printing devices, the RGB color space is used for color CRT monitors or computer graphic devices, and the HIS color space is used for devices dealing with hue, saturation, and intensity separately. Further, the CIE color space is often used to define so-called device-independent colors precisely reproducible in any device, for which there are color spaces of CIE-XYZ, CIE L*a*b, CIE L*u*V, and so on.

In addition to such different color spaces, color-reproducing devices can have a different color gamut. A color space indicates a color-defining method, that is, a method showing relationships among a certain color and the other colors, whereas the color gamut indicates a color reproduction range. Accordingly, if an inputted color signal has a different color gamut from a color gamut of a device reproducing the inputted color signal, it is necessary to properly convert the inputted color signal to match each other's color gamuts for better color reproduction.

In the meantime, such color-reproducing devices generally use the three primary colors, but, recently, there has been an attempt to extend a color gamut by using four or more primary colors. Typically, the MPD has emerged as a result of the attempt. The MPD is a display system which reproduces a wider color gamut by using four or more primary colors in order to extend a color gamut larger than the existing three-channel display system using the three primary colors.

FIG. 1 is a view for explaining the color gamut of such an MPD. In FIG. 1, the region marked with reference number 1 indicates a color gamut that one can perceive, the region marked with reference number 2 indicates the color gamut of the MPD, and the region marked with reference number 3 indicates the color gamut of a display system using the existing three primary colors.

As shown in FIG. 1, it can be seen that the color gamut of the MPD is extended compared to that of the conventional display system. Accordingly, the color gamut of the conventional system using the standard color signal does not match the color gamut of the MPD, and thus all the color gamut the MPD can reproduce can not be used if the standard color signal is reproduced on the MPD without conversion. Thus, in order to use the wider color gamut of the MPD, there needs to be a color conversion apparatus and method for converting an inputted standard color signal to match the color gamut of an inputted standard color signal with that of the MPD.

SUMMARY

Therefore, the present invention provides a color conversion apparatus and method for converting an inputted standard color signal to match a color gamut of the inputted standard color signal with a color gamut of an MPD on which the color signal is displayed, so that all the color gamut displayable on an MPD can be used.

The present invention may be achieved by providing a color conversion apparatus which converts an input color signal to match a color gamut of the input color signal with a color gamut of a target Multi Primary Display (MPD) using at least four or more primary colors, and comprises a WYV color signal conversion unit for converting the input color signal into a WYV color signal for an output; a color gamut matching gain calculation unit for calculating a matching gain which is a conversion constant for matching the color gamut of the input color signal with the color gamut of the target MPD; a color gamut matching unit for converting the WYV color signal based on the matching gain; an XYZ color signal conversion unit for converting the converted WYV color signal into an XYZ color signal for an output; and an MPD control vector calculation unit for calculating a control vector which is a driving signal of the target MPD corresponding to the XYZ color signal.

Preferably, the color conversion apparatus further comprises a linear correction unit for linearly correcting a non-linear standard RGB color signal into a standard RGB color signal and providing the corrected RGB color signal as the input color signal.

The color gamut matching gain calculation unit can decide a range of maximum chroma values while maintaining hue and luminance constant with reference to the color gamuts of the input color signal and target MPD, and calculate the matching gain based on ratios of the decided maximum chroma values. Further, the color gamut matching gain calculation unit can calculate the maximum chroma values from cross points of a surface equation representing the color gamut and linear equations satisfying conditions that maintain the hue and luminance constant.

Further, preferably, the color gamut matching gain calculation unit includes a 2D-LUT memory for tabulating and storing data corresponding to the matching gain; an address conversion unit for converting the WYV color signal into a 2D-LUT address to access the 2D-LUT memory; and an interpolation unit for outputting the matching gain calculated through interpolation of data outputted from the 2D-LUT memory.

In the meantime, a color conversion method according to the present invention converts an input color signal to match a color gamut of the input color signal with a color gamut of a target MPD using at least four or more primary colors, and comprises steps of converting the input color signal into a WYV color signal for an output; calculating a matching gain which is a conversion value for matching the color gamut of the input color signal with the color gamut of the target MPD; converting the WYV color signal based on the matching gain; converting the converted WYV color signal into an XYZ color signal for an output; and calculating a control vector which is a driving signal of the target MPD corresponding to the XYZ color signal. Preferably, the color conversion method further comprises a step of linearly correcting a non-linear standard RGB color signal into a standard RGB color signal and providing the corrected RGB color signal as the input color signal.

The matching gain calculation step can decide a range of maximum chroma values while maintaining hue and luminance constant with reference to the color gamuts of the input color signal and target MPD, and calculate the matching gain based on ratios of the decided maximum chroma values. Further, the matching gain calculation step can calculate the maximum chroma values from cross points of a surface equation representing the color gamut and linear equations satisfying conditions that maintain the hue and luminance constant.

Further, preferably, the matching gain calculation step includes steps of tabulating and storing data corresponding to the matching gain; converting the WYV color signal into a 2D-LUT address to access the stored data; and outputting the data corresponding to the 2D-LUT address, interpolating the outputted data, and outputting the matching gain.

BRIEF DESCRIPTION OF THE DRAWINGS

The above aspect and other features of the present invention will become more apparent by describing in detail an illustrative, non-limiting embodiment thereof with reference to the attached drawings, and wherein.

DETAILED DESCRIPTION OF THE ILLUSTRATIVE, NON-LIMITING EMBODIMENTS OF THE INVENTION

Hereinafter, the present invention will be described in detail with reference to the accompanying drawings.

Figure 1:
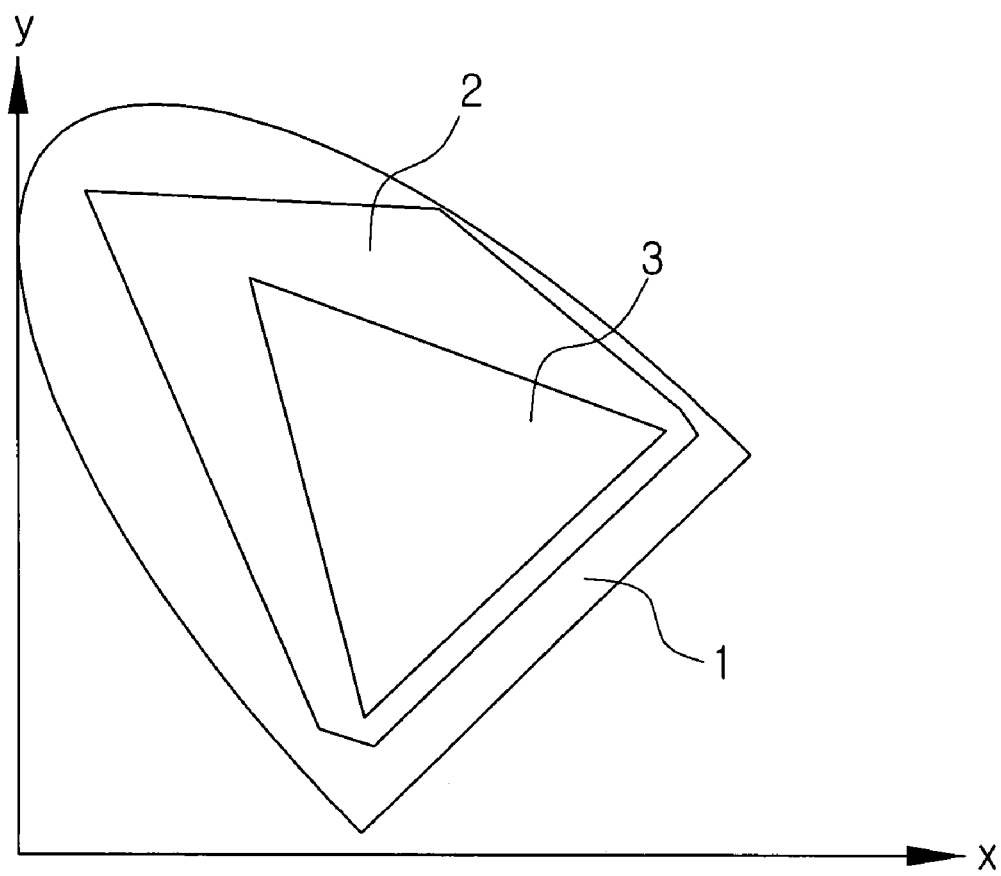
FIG. 1 is a view for explaining a color gamut of an MPD.
Figure 2:
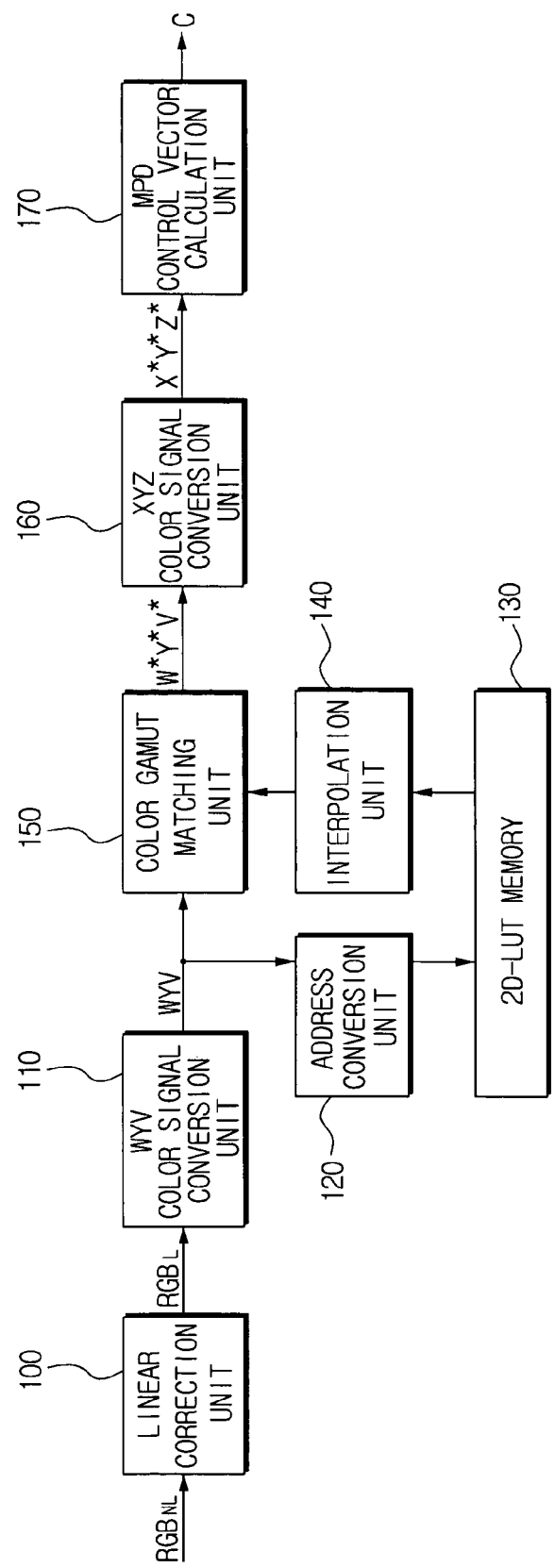
FIG. 2 is a block diagram for showing a color conversion apparatus according to an embodiment of the present invention.

FIG. 2 is a block diagram of a color conversion apparatus according to an embodiment of the present invention. Referring to FIG. 2, the color conversion apparatus has a linear correction unit 100, a WYV color signal conversion unit 110, an address conversion unit 120, a 2D-LUT memory 130, an interpolation unit 140, a color gamut matching unit 150, an XYZ color signal conversion unit 160, and an MPD control vector calculation unit 170.

The linear correction unit 100 linearly corrects and converts an inputted standard non-linear RGB color signal into a linear RGB color signal. The standard non-linear RGB color signal refers to diverse color signals according to respective standard specifications, including International Electro-Technical Commission (IEC) standardized sRGB, non-linear RGB signals compliant to HDTV standards ITU-R.BT.709, and so on. The WYV color signal conversion unit 110 coordinate-transforms the linear RGB color signal outputted from the linear conversion unit 100 into the WYV color space, and converts the linear RGB color signal into a WYV color signal for an output.

The address conversion unit 120 converts the signal outputted from the color signal conversion unit 110 into a 2D-LUT address signal so that the 2D-LUT memory 130 can be referred to, and 2D-LUT data corresponding to a matching gain is tabulated and stored in the 2D-LUT memory 130. The interpolation unit 140 interpolates data outputted from the 2D-LUT memory 130 and then calculates a final matching gain. The address conversion unit 120, 2D-LUT memory 130, and interpolation unit 140 construct a color gamut matching gain calculation unit for calculating the matching gain.

The color gamut matching unit 150 uses the matching gain outputted from the interpolation unit 140, and converts the color signal inputted from the color gamut matching unit 150 to match a color gamut of an MPD for an output. The XYZ color signal conversion unit 160 coordinate-transforms into the CIE-XYZ color space the color signal converted and outputted from the color gamut matching unit 150, and then converts the color signal into an XYZ color signal. Further, the MPD control vector calculation unit 170 calculates a control vector corresponding to the converted XYZ color signal, and the control vector outputted from the MPD control vector turns into a driving signal for the MPD.

Figure 3:
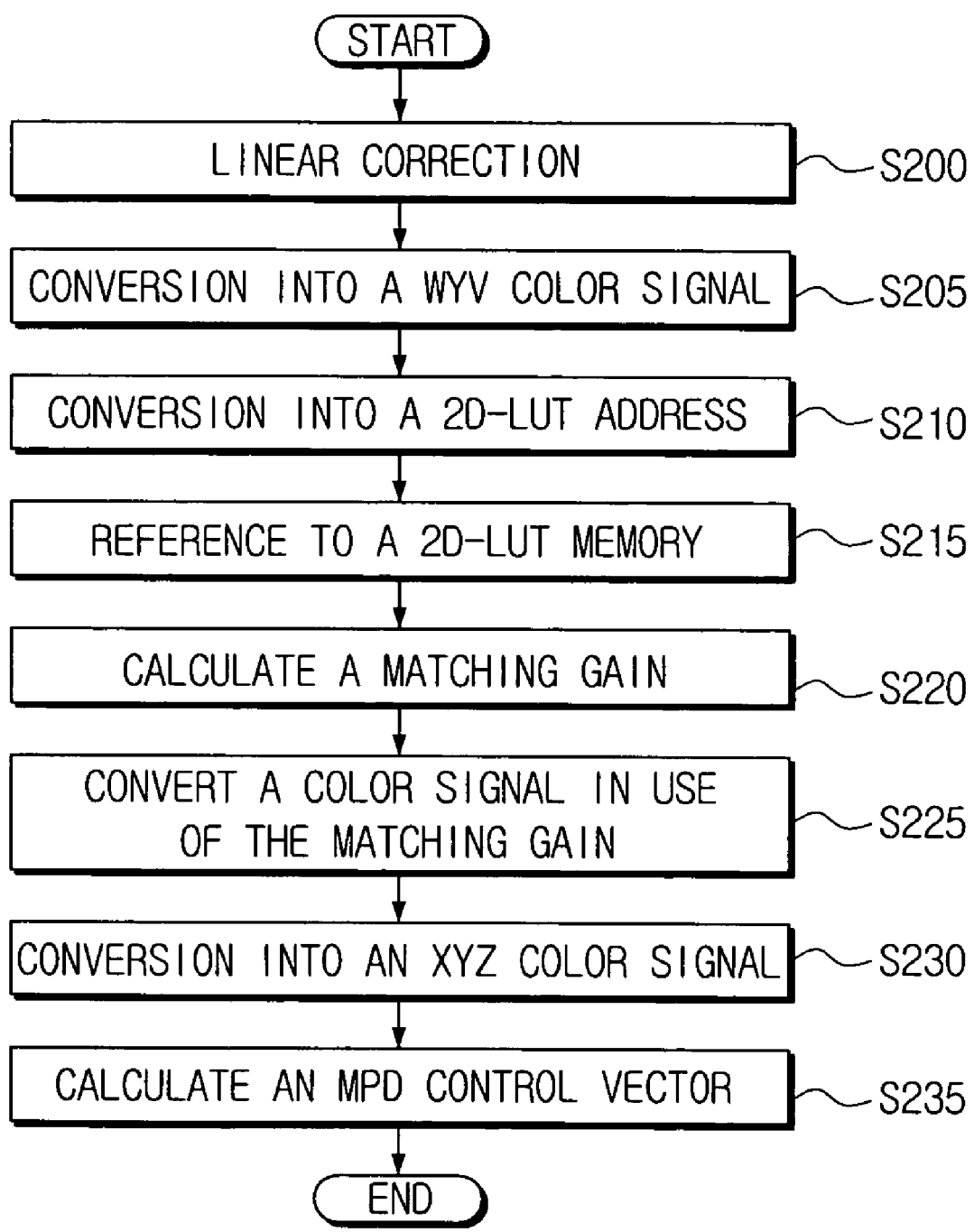
FIG. 3 is a flow chart for explaining operations of the color conversion apparatus of FIG. 2.

FIG. 3 is a flow chart for explaining the operations of the color conversion apparatus according to an embodiment of the present invention. The following is the description of the operations of the color conversion apparatus with reference to FIG. 2 and FIG. 3. First, the linear correction unit 100 linearly corrects an inputted standard non-linear RGB color signal RGBNL into a linear RGB color signal RGBL (S200). The linear RGB color signal RGBL corrected and outputted from the linear correction unit 100 is transferred to the WYV color signal conversion unit 110 and converted into a WYV color signal WYV (S205). Such a conversion of the linear RGB color signal into the WYV color signal in the WYV color space is for the sake of easy calculations in the color gamut matching process.

In the meantime, an RGB color signal can be converted into a WYV color signal using Equation 1 as follows:

$$\begin{pmatrix} W \\ Y \\ V \end{pmatrix} = T \begin{pmatrix} R \\ G \\ B \end{pmatrix} \qquad \text{[Equation 1]}$$

At this time, the WYV color space is a color space obtained from a CIE-XYZ color space of standard tristimulus coordinates through a linear transform, which is expressed in Equation 2 as follows:

$$\begin{pmatrix} W \\ Y \\ V \end{pmatrix} = N \begin{pmatrix} X \\ Y \\ Z \end{pmatrix} \qquad \text{[Equation 2]}$$

Further, the linear RGB color signal can be converted into an XYZ color signal by Equation 3 as follows:

$$\begin{pmatrix} W \\ Y \\ Z \end{pmatrix} = P \begin{pmatrix} R \\ G \\ B \end{pmatrix} \qquad \text{[Equation 3]}$$

Accordingly, the matrix T defined in Equation 1 can be expressed in a multiplication of a matrix N and a matrix P as in Equation 4 as follows, when Equation 2 and Equation 3 are applied.

$$T=NP \quad \text{[Equation 4]}$$

With such relationships, when the matrices N and P are first computed, the matrix T can be obtained by multiplying the two matrices. With the obtained matrix T applied to Equation 1, an RGB color signal can be converted into a WYV color signal. For example, in case of the sRGB or the ITU-R.BT.709 standard, the matrix P in Equation 3 has a value as follows:

$$P = \begin{pmatrix} 0.412391 & 0.357584 & 0.180481 \\ 0.212639 & 0.715169 & 0.072192 \\ 0.019331 & 0.119195 & 0.950532 \end{pmatrix} \quad \text{[Equation 5]}$$

Figure 4:
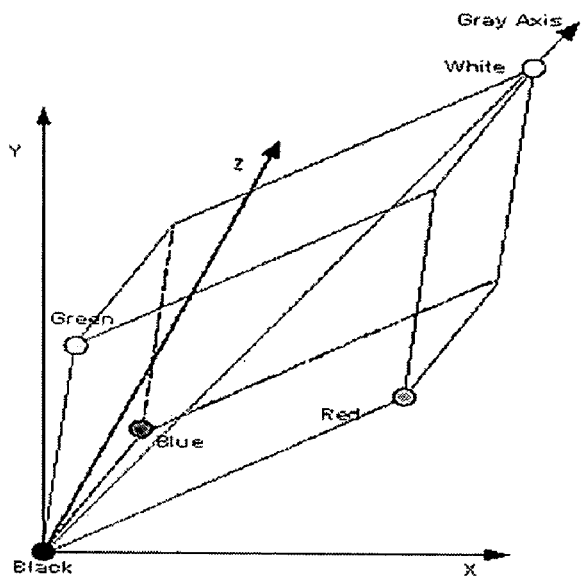
FIG. 4 is a view for explaining a CIE-XYZ color space.
Figure 5:
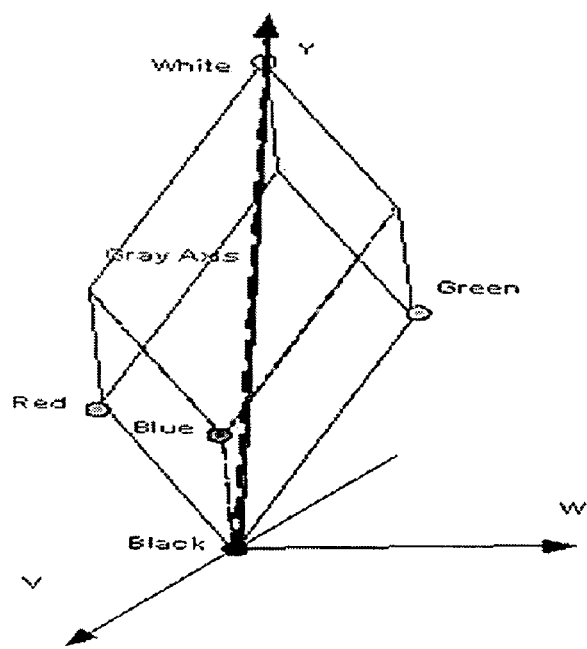
FIG. 5 is a view for explaining a YWV color space.

The matrix N in Equation 2 can be obtained through a process as follows. That is, as shown in FIG. 4 and FIG. 5, the achromatic axis in the CIE-XYZ color space is represented by a gray axis which is a diagonal line connecting two points of black and white colors. The magnitude in the radial direction of the normal vector with respect to the diagonal line represents the chroma C, and the direction represents the hue H. Therefore, in case that color gamut matching is performed in the CIE-XYZ color space, the achromatic axis is represented in a function of the XYZ orthogonal coordinate system so that its representation becomes more complicated. Accordingly, in order to reduce the complexity in a computation process, the achromatic axis is linearly transformed into the WYV color space dependent upon only the values of luminance Y as shown in FIG. 5. At this time, the matrix N used for the linear transformation can be defined in Equation 6 as follows:

$$N = \begin{pmatrix} c1 & c2 & c3 \\ 0 & 1 & 0 \\ c4 & c5 & c6 \end{pmatrix} \quad \text{[Equation 6]}$$

In here, the individual conversion constants C1~C6 are set depending upon minimum-maximum value conditions in the directions of axes W and V.

The color signal converted in the WYV color signal conversion unit 110 into the WYV color signal for an output is transferred to the address conversion unit 120, and converted into a 2D-LUT address signal referring to the 2D-LUT memory 130 (S210) as in Equation 7 as follows:

$$Y_{LUT} = \text{Quant}[Y] \quad \text{[Equation 7]}$$
$$H_{LUT} = \text{Quant}[H]$$
$$H = \text{Arctan}\left(\frac{V}{W}\right)$$

In Equation 7, the operator of Quant[ ] denotes formatting the quantization resolution of an input signal into a quantization step in the 2D-LUT address space. The 2D-LUT memory 130 is referred to in use of a 2D address outputted from the address conversion unit 120 (S215). 2D-LUT data corresponding to a matching gain of a corresponding color signal is tabulated and stored in the 2D-LUT memory 130, and 2D-LUT data corresponding to the 2D-LUT address referred to is outputted.

The 2D-LUT memory 130 uses a 2D-LUT address space less than a quantization depth of an input address for its efficient utilization. Thus, in case that an input address signal corresponds to the intermediate level of the quantization depth defined in the 2D-LUT address space, the interpolation is required from the limited 2D-LUT data. The interpolation unit 140 performs such an interpolation, applying diverse interpolation methods, such as the bilinear interpolation method, 2D Spline interpolation method, and so on, that perform interpolation by using values around the 2D-LUT data outputted from the 2D-LUT memory 130, to thereby compute a final matching gain (S220). The matching gain outputted from the interpolation unit 140 is transferred to the color gamut matching unit 150.

Figure 6A:
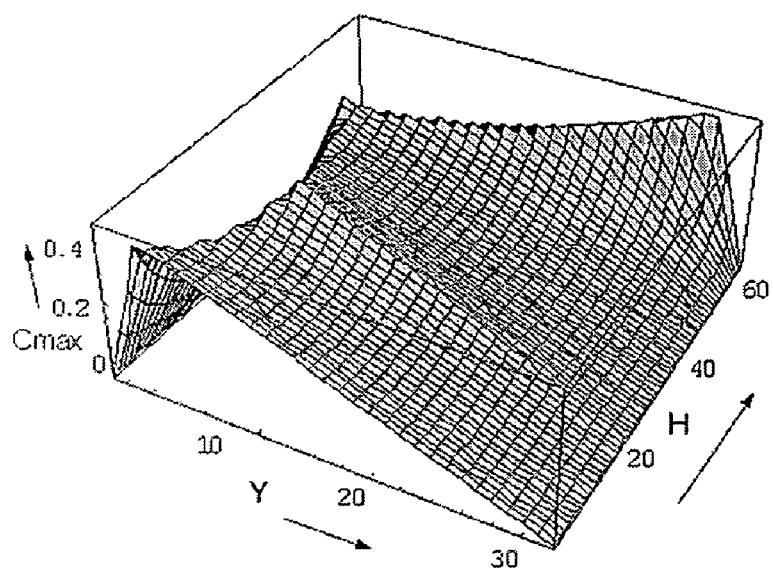
FIG. 6A to FIG. 6C are views for explaining matching gains.
Figure 6B:
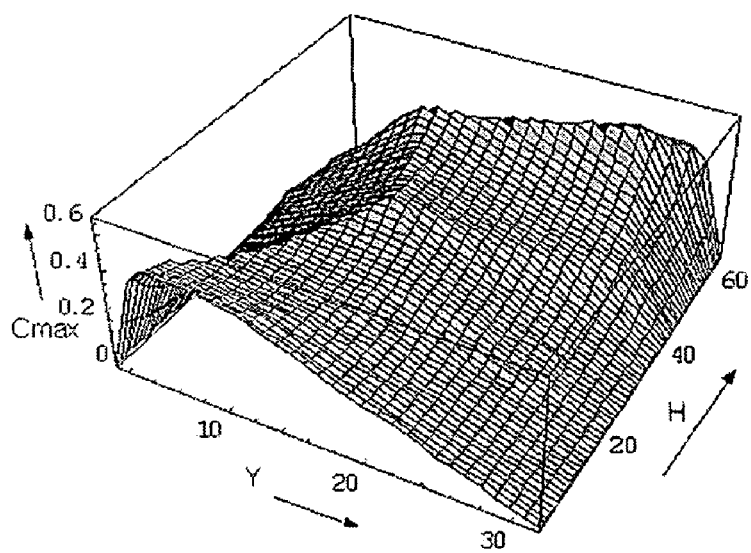
Figure 6C:
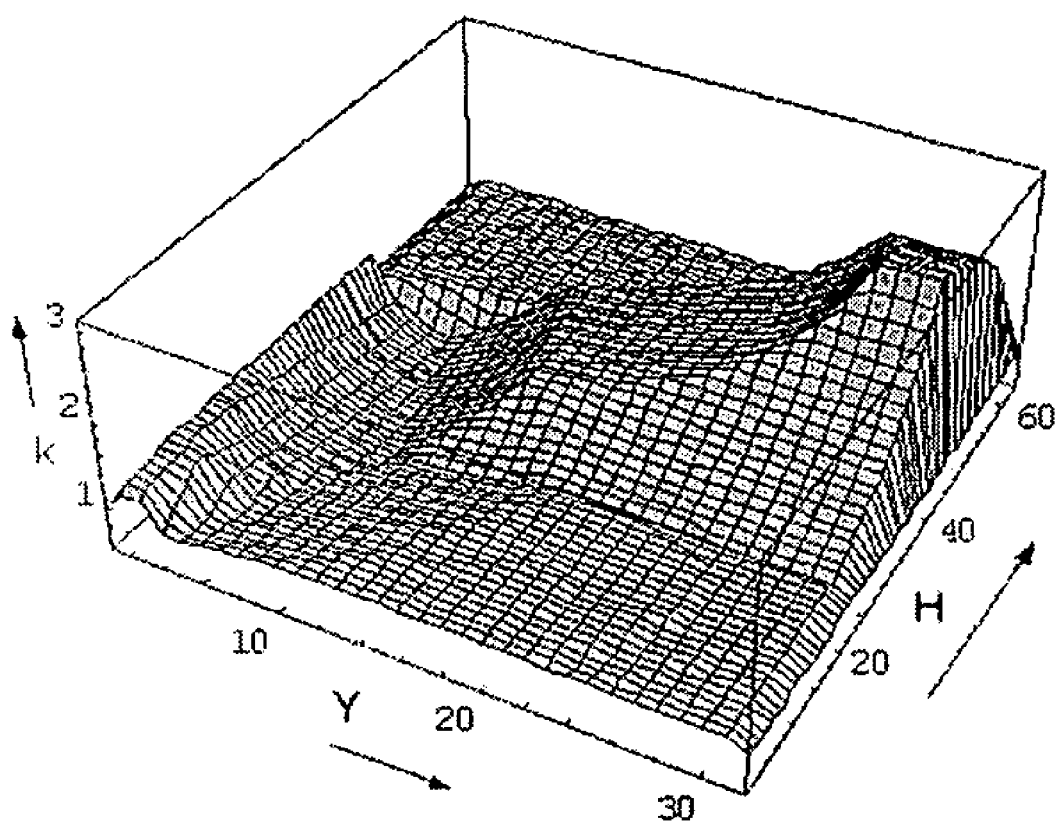

For the 2D-LUT data stored in the 2D-LUT memory 130, the color gamut boundaries of an input color signal as shown in FIG. 6A and the color gamut boundaries of a target MPD as shown in FIG. 6B are calculated based on values obtained in the WYV color space, and FIG. 6C shows such 2D-LUT data, that is, a matching gain k. FIG. 6A shows a color gamut when an input signal is compliant to the ITU-R.BT.709 standard, that is, in the maximum chroma in the WYU signal range. Further, FIG. 6A and FIG. 6C show luminance Y ranging from 0 to 1 that is quantized in 32 steps and hue H ranging from 0° to 359° that is quantized in 64 steps, respectively.

Figure 7:
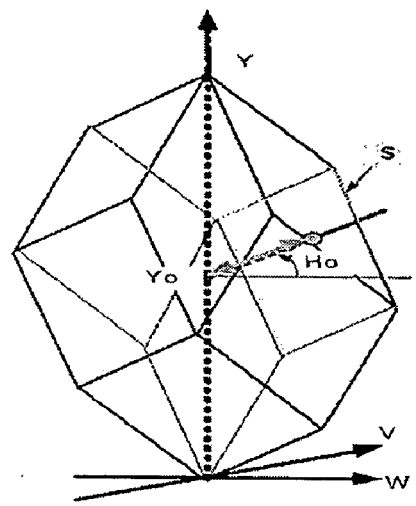
FIG. 7 and FIG. 8 are views for explaining a matching gain calculation process.

Used for the matching gain calculation is the maximum chroma value in the color gamut of an input color signal corresponding to the luminance and hue of the input color signal and the maximum chroma value in the color gamut of an MPD, and the maximum chroma values can be calculated through diverse methods. For example, in case of a 4-channel MPD using four primary colors, as shown in FIG. 7, the maximum chroma Cmax(Yo, Ho) at values of luminance Y=Yo and hue H=Ho is obtained at a cross point of a linear equation(Y=Yo, H=Ho) and a surface equation S of the MDP color gamut. In general, a surface equation can be calculated with the determinant expressed in Equation 8 or in Equation 9 as follows if three points existing on a surface, that is, a P1(W1, Y1, V1), a P2(W2, Y2, V2), and a P3(W3, Y3, V3), are known.

$$\begin{vmatrix} W = W1 & Y = Y1 & V = V1 \\ W2 = W1 & Y2 - Y1 & V2 - V1 \\ W3 - W1 & Y3 - Y1 & V3 - V1 \end{vmatrix} = 0 \quad \text{[Equation 8]}$$

Or the determinant can be expressed in a vector format as follows:

$$(F-P1)(P2-P1)(P3-P1)=0 \text{ with } F=(W,Y,V) \quad \text{[Equation 9]}$$

In here, the respective points P1, P2, and P3 are vertices at a color gamut boundary, and the vertices can be calculated in advance for a corresponding surface since they are obtained from combinations of maximum and minimum values of channel signals in limited ranges for respective control vectors C=(C1, C2, . . . , Cn) given in an MPD Forward Model as follows:

$$\begin{pmatrix} W \\ Y \\ V \end{pmatrix} = N \begin{pmatrix} X \\ Y \\ Z \end{pmatrix} \quad \text{[Equation 10]}$$

$$= N \cdot \begin{pmatrix} a_1 & a_2 & \cdots & a_{n-1} & a_n \\ b_1 & a_2 & \cdots & b_{n-1} & b_n \\ c_1 & c_c & \cdots & c_{n-1} & c_n \end{pmatrix} \begin{pmatrix} C_1 \\ C_2 \\ \cdots \\ C_{n-1} \\ C_n \end{pmatrix}$$

Here, n denotes the number of primary colors, that is, the number of channels.

If ratios are calculated and tabulated with respect to the maximum chroma value Cmax1(Y, H) of the MPD and the maximum chroma value Cmax2(Y, H) of an inputted standard color signal, which are obtained as above, according to Equation 11 as follows, a table for matching gains can be obtained.

$$k(Y, H) = \frac{C_{\max 1}(Y, H)}{C_{\max 2}(Y, H)} \quad \text{[Equation 11]}$$

The calculated matching gain is applied to a color signal WYV inputted to the color gamut matching unit 150, and converted to match the color gamut of the target MPD (S225), which can be expressed in Equation 12 as follows:

$$(W^*, V^*) = k(Y, H) E(W, V) \quad \text{[Equation 12]}$$

Figure 8:
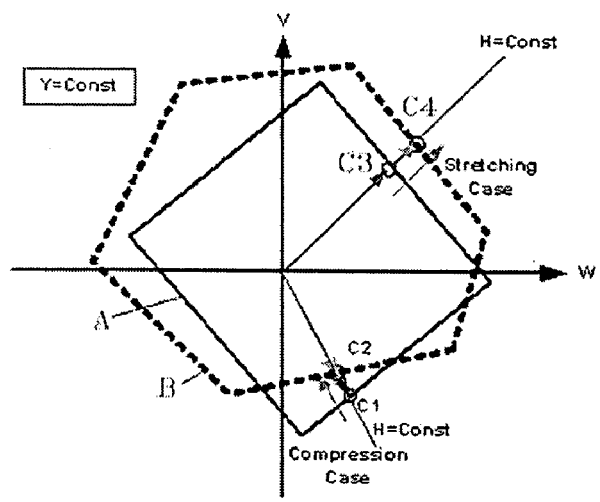

Descriptions are made on the meaning of Equation 12 with reference to FIG. 8 as follows. That is, FIG. 8 is a view for showing the color gamut of an inputted standard color signal and the color gamut of a target MPD in the WYV color space, wherein a region A in solid line denotes the color gamut of the standard color signal and a region B in dotted line denotes the color gamut of the target MPD. As shown in FIG. 8, since the color gamut of the inputted standard color signal and the color gamut of the target MPD are not matched with each other, there needs to be a conversion of the inputted color signal to match each other's color gamuts. That is, a color conversion is needed that stretches(as in case of C3–>C4) or compresses(as in case of C1–>C2) the chroma C while maintaining the luminance Y and the hue H constant. A value used for such a compression or stretch becomes a matching gain.

A signal W*Y*V* converted to match the color gamuts is converted in the XYZ color signal conversion unit 160 into a signal of the XYZ color space which is a tristimulus standard color signal (S230). The XYZ color signal converted in the XYZ color signal conversion unit 160 is transferred to the MPD control vector calculation unit 170 and then a control vector which is an MPD driving signal is calculated (S235).

Through the above process, an inputted color signal can be converted to match the color gamut of an MPD reproducing the color signal, by which all the color gamut the MPD can reproduce is able to be used.

As described above, the present invention can convert an inputted color signal to match the color gamut of the inputted standard color signal with the color gamut of an MPD using at least four or more primary colors. Accordingly, all the MPD-reproducible color gamut can be used, which enables images to be obtained with excellent color reproducibility.

Although the exemplary embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. A color conversion apparatus for converting an input color signal to match a color gamut of the input color signal with a color gamut of a target Multi Primary Display (MPD) using at least four primary colors, the apparatus comprising:
    a WYV color signal conversion unit for converting the input color signal into a WYV color signal for a first output;
    a color gamut matching gain calculation unit for calculating a matching gain which is a conversion value for matching the color gamut of the input color signal with the color gamut of the target MPD;
    a color gamut matching unit for converting the WYV color signal based on the matching gain;
    an XYZ color signal conversion unit for converting the converted WYV color signal into an XYZ color signal for a second output; and
    an MPD control vector calculation unit for calculating a control vector which is a driving signal of the target MPD corresponding to the XYZ color signal.

2. The color conversion apparatus as claimed in claim 1, further comprising a linear correction unit for linearly correcting a non-linear standard RGB color signal into a standard RGB color signal and providing the corrected RGB color signal as the input color signal.

3. The color conversion apparatus as claimed in claim 1, wherein the color gamut matching gain calculation unit decides a range of maximum chroma values while maintaining hue and luminance constant with reference to the color gamuts of the input color signal and target MPD, and calculates the matching gain based on ratios of the decided maximum chroma values.

4. The color conversion apparatus as claimed in claim 3, wherein the color gamut matching gain calculation unit calculates the maximum chroma values from cross points of a surface equation representing the color gamut and linear equations satisfying conditions that maintain the hue and luminance constant.

5. The color conversion apparatus as claimed in claim 1, wherein the color gamut matching gain calculation unit includes:
    a 2D-LUT memory for tabulating and storing data corresponding to the matching gain;
    an address conversion unit for converting the WYV color signal into a 2D-LUT address to access the 2D-LUT memory; and
    an interpolation unit for outputting the matching gain calculated through interpolation of data outputted from the 2D-LUT memory.

6. A color conversion method for converting an input color signal to match a color gamut of the input color signal with a color gamut of a target MPD using at least four primary colors, comprising:
    converting the input color signal into a WYV color signal for a first output;
    calculating a matching gain which is a conversion value for matching the color gamut of the input color signal with the color gamut of the target MPD;
    converting the WYV color signal based on the matching gain;

converting the converted WYV color signal into an XYZ color signal for a second output; and calculating a control vector which is a driving signal of the target MPD corresponding to the XYZ color signal.

7. The color conversion method as claimed in claim 6, further comprising linearly correcting a non-linear standard RGB color signal into a standard RGB color signal and providing the corrected RGB color signal as the input color signal.

8. The color conversion method as claimed in claim 6, wherein the matching gain calculation step decides a range of maximum chroma values while maintaining hue and luminance constant with reference to the color gamuts of the input color signal and target MPD, and calculates the matching gain based on ratios of the decided maximum chroma values.

9. The color conversion method as claimed in claim 8, wherein the matching gain calculation step calculates the maximum chroma values from cross points of a surface equation representing the color gamut and linear equations satisfying conditions that maintain the hue and luminance constant.

10. The color conversion method as claimed in claim 6, wherein the matching gain calculation step comprises:

tabulating and storing data corresponding to the matching gain;

converting the WYV color signal into a 2D-LUT address to access the stored data; and outputting the data corresponding to the 2D-LUT address, interpolating the outputted data, and outputting the matching gain.

* * * * *